(12) United States Patent
Brown

(10) Patent No.: US 10,346,244 B2
(45) Date of Patent: Jul. 9, 2019

(54) SHARED ADDRESS COUNTERS FOR MULTIPLE MODES OF OPERATION IN A MEMORY DEVICE

(71) Applicant: Micron Technology, Inc., Boise, ID (US)

(72) Inventor: David R. Brown, Lucas, TX (US)

(73) Assignee: Micron Technology, Inc., Boise, ID (US)

( * ) Notice: Subject to any disclaimer, the term of this patent is extended or adjusted under 35 U.S.C. 154(b) by 41 days.

(21) Appl. No.: 15/674,178

(22) Filed: Aug. 10, 2017

(65) Prior Publication Data

US 2019/0050284 A1 Feb. 14, 2019

(51) Int. Cl.
*G06F 11/10* (2006.01)
*G06F 3/06* (2006.01)

(52) U.S. Cl.
CPC ........ *G06F 11/1044* (2013.01); *G06F 3/0604* (2013.01); *G06F 3/0659* (2013.01); *G06F 3/0683* (2013.01); *G06F 11/106* (2013.01)

(58) Field of Classification Search
CPC ............. G06F 11/1068; G06F 11/1072; G06F 3/0619; G06F 3/064; G06F 3/0679; G06F 11/1044; G06F 11/106; G06F 3/0604; G06F 3/0683
See application file for complete search history.

(56) References Cited

U.S. PATENT DOCUMENTS

| | | | |
|---|---|---|---|
| 5,777,946 A | 7/1998 | Kazuko et al. | |
| 8,788,910 B1 | 7/2014 | Northcott | |
| 2006/0268652 A1 | 11/2006 | Jeong | |
| 2008/0034154 A1 | 2/2008 | Lee et al. | |
| 2009/0006913 A1 | 1/2009 | Cho et al. | |
| 2017/0060681 A1* | 3/2017 | Halbert | G06F 11/1068 |
| 2017/0139771 A1* | 5/2017 | Chung | G06F 11/1068 |

FOREIGN PATENT DOCUMENTS

| | | |
|---|---|---|
| CN | 101488763 A | 1/2012 |
| EP | 1195770 A | 4/2002 |
| TW | 200410216 A | 6/2004 |
| TW | 201145305 A | 12/2011 |
| WO | 2007098445 A1 | 8/2007 |

OTHER PUBLICATIONS

PCT International Search Report & Written Opinion for PCT Application No. PCT/US2018/027820 dated Jul. 30, 2018; 5 Pages.
Taiwan Patent Application No. 107114133 Office Action dated Mar. 5, 2019; 12 pages.

* cited by examiner

*Primary Examiner* — Shelly A Chase
(74) *Attorney, Agent, or Firm* — Fletcher Yoder, P.C.

(57) ABSTRACT

As described above, certain modes of operation, such as the Fast Zero mode and the ECS mode, may facilitate sequential access to individual cells of a memory array. To facilitate this functionality, a command controller may be provided, including one or more individual controllers to control the address sequencing when a particular mode entry command (e.g., Fast Zero or ECS) is received. In order to generate internal addresses to be accessed sequentially, one or more counters may also be provided. Advantageously, the counters may be shared such that they can be used in any mode of operation that may require address sequencing of all or large portions of the memory array, such as the Fast Zero mode or the ECS mode.

17 Claims, 3 Drawing Sheets

SHARED ADDRESS COUNTERS FOR MULTIPLE MODES OF OPERATION IN A MEMORY DEVICE

BACKGROUND

Embodiments described herein relate generally to the field of memory devices. More specifically, the current embodiments include one or more systems, devices, and methods for utilizing shared address counters for multiple modes of operation.

DESCRIPTION OF RELATED ART

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various modes of operation in memory devices may require access to large sections or all of the memory array on the memory device. For instance, in certain instances, such as testing, the memory device may be set to a mode such that each memory cell of the memory array may be individually accessed. The accessing of each memory cell in certain modes of operation may be an iterative process such that each of the memory cells in the memory array is sequentially accessed. In order to facilitate such functionality, it may be desirable to provide fast and efficient methods and structures for allowing sequential access to each memory cell in a sequential manner. Further, such sequential access should be provided without necessitating the usage of extra hardware components which may increase cost of the memory device and increase the size of the memory device. Accordingly, embodiments described herein may be directed to one or more of the problems set forth above.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As is described in detail below, memory devices may employ modes of operation that facilitate sequential access to all memory cells or large blocks of memory cells in a memory array. For instance, in double data rate type five synchronous dynamic random access memory (DDR5 SDRAM), certain modes of operation, such as the Fast Zero mode and the Error, Check and Scrub (ECS) mode, provide that each cell of the memory array is sequentially accessed. In order to sequentially access each memory cell, one or more commands may be received by the memory device. Controllers in the memory device may be used to generate internal memory addresses such that each cell can be individually accessed. One or more counters may be used to sequence through internal addresses to access each memory cell of the array. Because counters may increase the cost and/or size of the memory device, present embodiments share the same counters in utilizing each of the Fast Zero mode and the ECS mode, to minimize the additional hardware used to generate the address sequencing to access the entire memory array.

Figure 1:
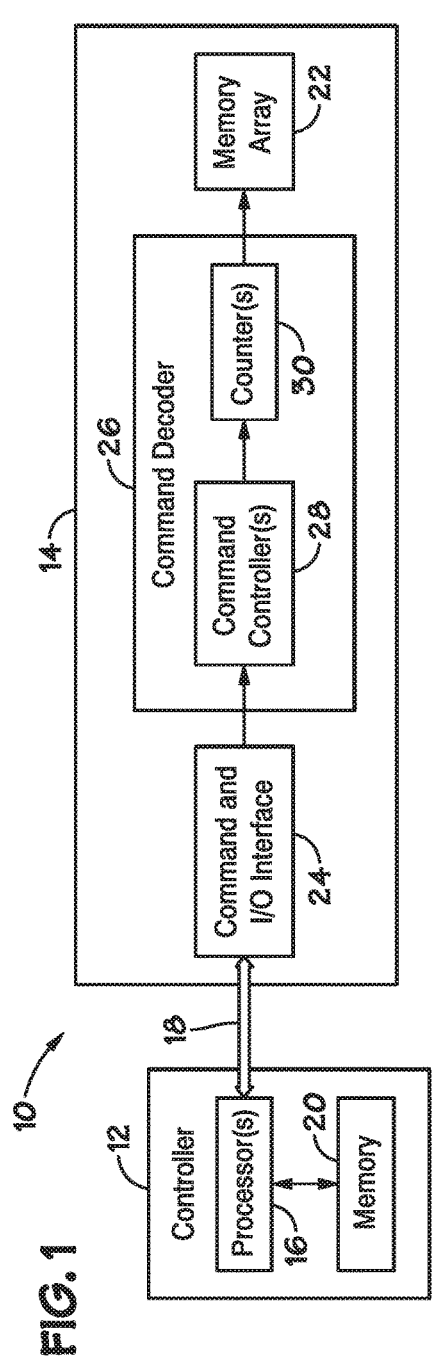
FIG. 1 is a block diagram illustrating a computer system, in accordance with an embodiment of the present disclosure.

Referring now to FIG. 1, a simplified block diagram of a computer system 10 is illustrated. The computer system 10 includes a controller 12 and a memory device 14. The controller 12 may include processing circuitry, such as one or more processors 16 (e.g., one or more microprocessors), that may execute software programs to provide various signals to the memory device 14 over one or more bi-directional communication buses 18 to facilitate the transmission and receipt of data to be written to or read from the memory device 14. Moreover, the processor(s) 16 may include multiple microprocessors, one or more "general-purpose" microprocessors, one or more special-purpose microprocessors, and/or one or more application specific integrated circuits (ASICS), or some combination thereof. For example, the processor(s) 16 may include one or more reduced instruction set (RISC) processors. The controller 12 may be coupled to one or more memories 20 that may store information such as control logic and/or software, look up tables, configuration data, etc. In some embodiments, the processor(s) 16 and/or the memory 20 may be external to the controller 12. The memory 20 may include a tangible, non-transitory, machine-readable-medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof). The memory 20 may store a variety of information and may be used for various purposes. For example, the memory 20 may store machine-readable and/or processor-executable instructions (e.g., firmware or software) for the processor(s) 16 to execute, such as instructions for providing various signals and commands to the memory device 14 to facilitate the transmission and receipt of data to be written to or read from the memory device 14.

The memory device 14 includes a memory array 22 of individual memory cells. As described further below, the memory array 22 may include one or more memory banks that may be grouped or partitioned in a variety of ways to provide access to the cells of the memory array 22, as described below. The controller 12 may communicate with the memory device 14 through one or more command and input/output (I/O) interfaces 24. In general, the command and input/output interfaces 24 provide access to various components of the memory device 14 by external devices, such as the controller 12.

The memory device 14 may include a command decoder 26. The command decoder 26 may receive command signals from the command and input/output (I/O) interfaces 24 and may decode the command signals to provide various internal commands. For instance, the command decoder 26 may decode commands, such as read commands, write commands, mode-register set commands, activate commands, etc., and provide access to specified regions of the memory array 22. As described above, certain modes of operation, such as the Fast Zero mode and the ECS mode, may facilitate sequential access to individual cells of the memory array 22. To facilitate this functionality, the command decoder 26 includes a command controller 28 that includes one or more individual controllers to control the address sequencing when a particular mode entry command (e.g., Fast Zero or ECS) is received. Further, in order to generate internal addresses to be accessed sequentially, one or more counters 30 may also be provided. Advantageously, the counters 30 may be shared such that they can be used in any mode of operation that may require address sequencing of all or large portions of the memory array 22, such as the Fast Zero mode or the ECS mode. The use and implementation of the command controller 28 and the counters 30 will be described in greater detail below with regard to FIGS. 3-5. It should be noted that while the command controller 28 and counters 30 are illustrated as being part of the command decoder 26, alternatively, these elements may be provided elsewhere on the memory device 14.

Figure 2:
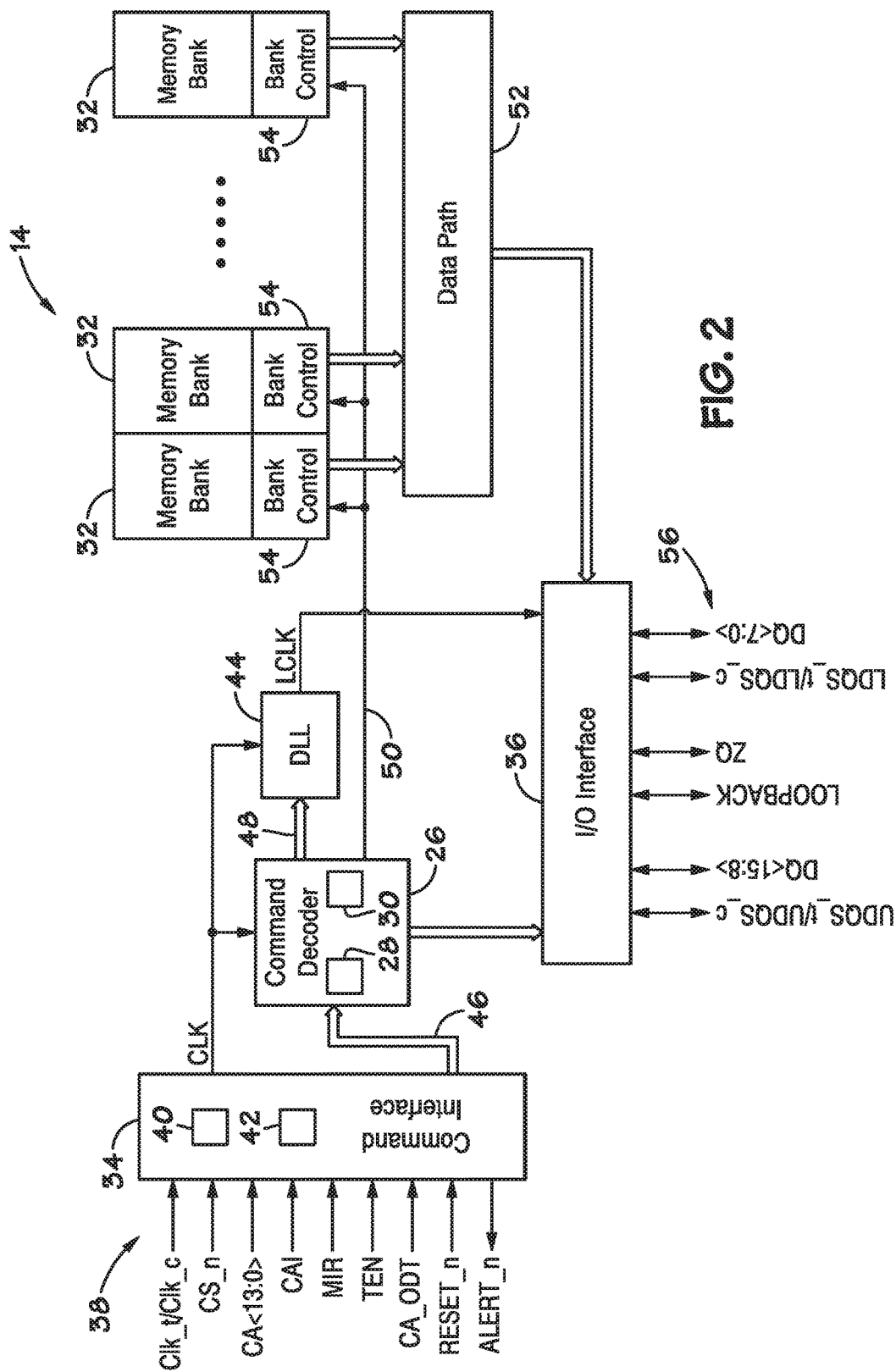
FIG. 2 is a block diagram illustrating a memory device, in accordance with an embodiment of the present disclosure.

FIG. 2 is a simplified block diagram illustrating certain additional features of the memory device 14 of FIG. 1. Specifically, the block diagram of FIG. 2 is a functional block diagram illustrating certain additional features and related functionality of the memory device 14. In accordance with one embodiment, the memory device 14 may be a double data rate type five synchronous dynamic random access memory (DDR5 SDRAM) device. Various features of DDR5 SDRAM allow for reduced power consumption, more bandwidth and more storage capacity compared to prior generations of DDR SDRAM.

The memory device 14, may include a memory array logically and functionally grouped into a number of memory banks 32. The memory banks 32 may be DDR5 SDRAM memory banks, for instance. The memory banks 32 may be provided on one or more chips (e.g., SDRAM chips) that are arranged on dual inline memory modules (DIMMS). Each DIMM may include a number of SDRAM memory chips (e.g., ×8 or ×16 memory chips), as will be appreciated. Each SDRAM memory chip may include one or more memory banks 32. The memory device 14 represents a portion of a single memory chip (e.g., SDRAM chip) having a number of memory banks 32. For DDR5, the memory banks 32 may be further arranged to form bank groups. For instance, for an 8 gigabit (Gb) DDR5 SDRAM, the memory chip may include 16 memory banks 32, arranged into 8 bank groups, each bank group including 2 memory banks. For a 16 Gb DDR5 SDRAM, the memory chip may include 32 memory banks 32, arranged into 8 bank groups, each bank group including 4 memory banks, for instance. Various other configurations, organization and sizes of the memory banks 32 on the memory device 14 may be utilized depending on the application and design of the overall system.

As previously described, the memory device 14 may include one or more command and input/output (I/O) interfaces. For instance, the memory device 14 may include a command interface 34 and an input/output (I/O) interface 36. The command interface 34 is configured to provide a number of signals (e.g., signals 38) from an external device (not shown), such as a processor or controller. The processor or controller may provide various signals 38 over one or more bi-directional data buses (e.g., data bus 18) to and from the memory device 14 to facilitate the transmission and receipt of data to be written to or read from the memory device 14.

As will be appreciated, the command interface 34 may include a number of circuits, such as a clock input circuit 40 and a command address input circuit 42, for instance, to ensure proper handling of the signals 38. The command interface 34 may receive one or more clock signals from an external device. Generally, double data rate (DDR) memory utilizes a differential pair of system clock signals, referred to herein as the true clock signal (Clk_t/) and the complementary clock signal (Clk_c). The positive clock edge for DDR refers to the point where the rising true clock signal Clk_t/ crosses the falling complementary clock signal Clk_c, while the negative clock edge indicates that transition of the falling true clock signal Clk_t and the rising of the complementary clock signal Clk_c. Commands (e.g., read command, write command, etc.) are typically entered on the positive edges of the clock signal and data is transmitted or received on both the positive and negative clock edges.

The clock input circuit 40 receives the true clock signal (Clk_t/) and the complementary clock signal (Clk_c) and generates an internal clock signal CLK. The internal clock signal CLK is supplied to an internal clock generator 44, such as a delay locked loop (DLL) circuit. The internal clock generator 44 generates a phase controlled internal clock signal LCLK based on the received internal clock signal CLK. The phase controlled internal clock signal LCLK is supplied to the I/O interface 36, for instance, and is used as a timing signal for determining an output timing of read data.

The internal clock signal CLK may also be provided to various other components within the memory device 14 and may be used to generate various additional internal clock signals. For instance, the internal clock signal CLK may be provided to a command decoder 26. The command decoder 26 may receive command signals from the command bus 46 and may decode the command signals to provide various internal commands. For instance, the command decoder 26 may provide command signals to the internal clock generator 44 over the bus 48 to coordinate generation of the phase controlled internal clock signal LCLK. The phase controlled internal clock signal LCLK may be used to clock data through the I/O interface 36, for instance.

Further, the command decoder 26 may decode commands, such as read commands, write commands, activate commands, mode-register set commands, such as Fast Zero Entry and ECS commands, etc., and provide access to a particular memory bank 32 corresponding to the command, via the bus path 50. As will be appreciated, the memory device 14 may include various other decoders, such as row decoders and column decoders, to facilitate access to the memory banks 32. In one embodiment, each memory bank 32 includes a bank control block 54 which provides the necessary decoding (e.g., row decoder and column decoder), as well as other features, such as timing control and data control, to facilitate the execution of commands to and from the memory banks 32.

As previously described with regard to FIG. 1 and described further below with regard to FIGS. 3-5, the command decoder 26 may include one or more command controllers 28 to facilitate certain functions, such as implementation of the Fast Zero Entry mode and ECS mode of operation. In addition, the command decoder 26 may include one or more counters 30 that may be utilized under control of the command controller(s) 28 to generate internal addresses for sequential access of cells of the individual storage locations within each memory bank 32, as described in greater detail below. Advantageously, by utilizing the same set of counters 30 for each of the various modes of operation that employ sequential accessing schemes, such as Fast Zero and ECS modes, rather than employing individual counters for each independent mode, the inclusion of additional hardware components (e.g., counters) can be avoided.

The memory device 14 executes operations, such as read commands and write commands, based on the command/address signals received from an external device, such as a processor. In one embodiment, the command/address bus may be a 14-bit bus to accommodate the command/address signals (CA<13:0>). The command/address signals are clocked to the command interface 34 using the clock signals (Clk_t/ and Clk_c). The command interface 34 may include a command address input circuit 42 which is configured to receive and transmit the commands to provide access to the memory banks 32, through the command decoder 26, for instance. In addition, the command interface 34 may receive a chip select signal (CS_n). The CS_n signal enables the memory device 14 to process commands on the incoming CA<13:0> bus. Access to specific banks 32 within the memory device 14 is encoded on the CA<13:0> bus with the commands.

In addition, the command interface 34 may be configured to receive a number of other command signals. For instance, a command/address on die termination (CA_ODT) signal may be provided to facilitate proper impedance matching within the memory device 14. A reset command (RESET_n) may be used to reset the command interface 34, status registers, state machines and the like, during power-up for instance. The command interface 34 may also receive a command/address invert (CAI) signal which may be provided to invert the state of command/address signals CA<13:0> on the command/address bus, for instance, depending on the command/address routing for the particular memory device 14. A mirror (MIR) signal may also be provided to facilitate a mirror function. The MIR signal may be used to multiplex signals so that they can be swapped for enabling certain routing of signals to the memory device 14, based on the configuration of multiple memory devices in a particular application. Various signals to facilitate testing of the memory device 14, such as the test enable (TEN) signal, may be provided, as well. For instance, the TEN signal may be used to place the memory device 14 into a test mode for connectivity testing.

The command interface 34 may also be used to provide an alert signal (ALERT_n) to the system processor or controller for certain errors that may be detected. For instance, an alert signal (ALERT_n) may be transmitted from the memory device 14 if a cyclic redundancy check (CRC) error is detected. Other alert signals may also be generated. Further, the bus and pin for transmitting the alert signal (ALERT_n) from the memory device 14 may be used as an input pin during certain operations, such as the connectivity test mode executed using the TEN signal, as described above.

Data may be sent to and from the memory device 14, utilizing the command and clocking signals discussed above, by transmitting and receiving data signals 56 through the I/O interface 36. More specifically, the data may be sent to or retrieved from the memory banks 32 over the data path 52, which includes a plurality of bi-directional data buses. Data I/O signals, generally referred to as DQ signals, are generally transmitted and received in one or more bi-directional data busses. For certain memory devices, such as a DDR5 SDRAM memory device, the I/O signals may be divided into upper and lower bytes. For instance, for a x16 memory device, the I/O signals may be divided into upper and lower IO signals (e.g., DQ<15:8> and DQ<7:0>) corresponding to upper and lower bytes of the data signals, for instance.

To allow for higher data rates within the memory device 14, certain memory devices, such as DDR memory devices may utilize data strobe signals, generally referred to as DQS signals. The DQS signals are driven by the external processor or controller sending the data (e.g., for a write command) or by the memory device 14 (e.g., for a read command). For read commands, the DQS signals are effectively additional data output (DQ) signals with a predetermined pattern. For write commands, the DQS signals are used as clock signals to capture the corresponding input data. As with the clock signals (Clk_t/ and Clk_c), the data strobe (DQS) signals may be provided as a differential pair of data strobe signals (DQS_t/ and DQS_c) to provide differential pair signaling during reads and writes. For certain memory devices, such as a DDR5 SDRAM memory device, the differential pairs of DQS signals may be divided into upper and lower data strobe signals (e.g., UDQS_t/ and UDQS_c; LDQS_t/ and LDQS_c) corresponding to upper and lower bytes of data sent to and from the memory device 14, for instance.

An impedance (ZQ) calibration signal may also be provided to the memory device 14 through the IO interface 36. The ZQ calibration signal may be provided to a reference pin and used to tune output drivers and ODT values by adjusting pull-up and pull-down resistors of the memory device 14 across changes in process, voltage and temperature (PVT) values. Because PVT characteristics may impact the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 14 and GND/VSS external to the memory device 14. This resistor acts as a reference for adjusting internal ODT and drive strength of the I/O pins.

In addition, a loopback signal (LOOPBACK) may be provided to the memory device 14 through the I/O interface 36. The loopback signal may be used during a test or debugging phase to set the memory device 14 into a mode wherein signals are looped back through the memory device 14 through the same pin. For instance, the loopback signal may be used to set the memory device 14 to test the data output (DQ) of the memory device 14. Loopback may include both a data and a strobe or possibly just a data pin. This is generally intended to be used to monitor the data captured by the memory device 14 at the I/O interface 36.

As will be appreciated, various other components such as power supply circuits (for receiving external VDD and VSS signals), mode registers (to define various modes of programmable operations and configurations), read/write amplifiers (to amplify signals during read/write operations), temperature sensors (for sensing temperatures of the memory device 14), etc., may also be incorporated into the memory system 10. Accordingly, it should be understood that the block diagram of FIG. 2 is only provided to highlight certain functional features of the memory device 14 to aid in the subsequent detailed description.

Figure 3:
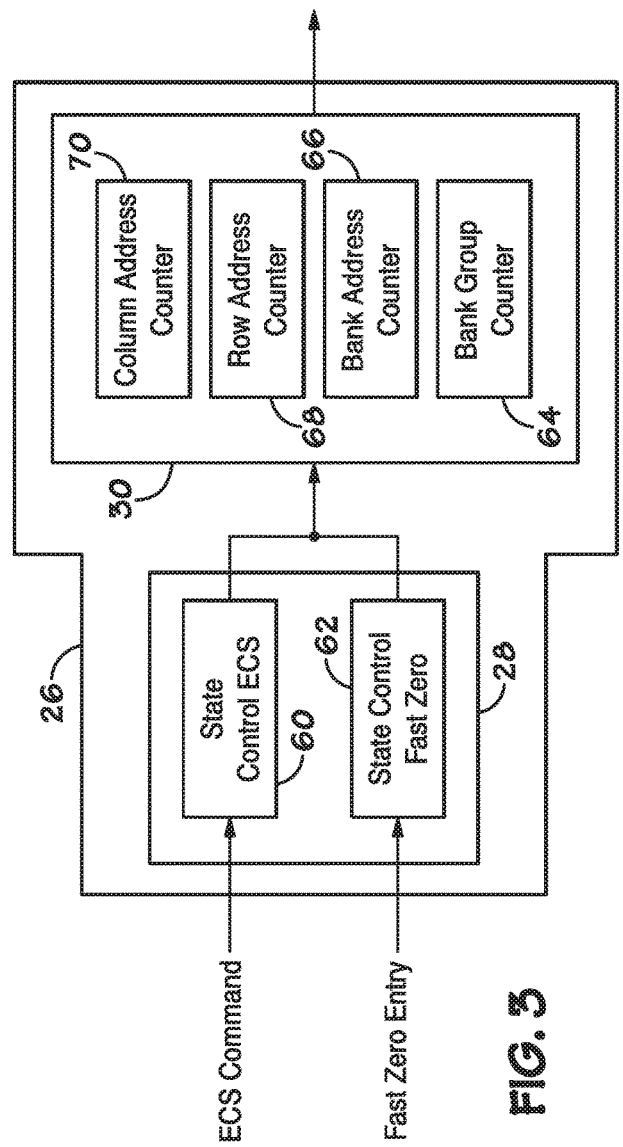
FIG. 3 is a block diagram of a portion of the memory device of FIG. 2, in accordance with an embodiment of the present disclosure.

Referring now to FIG. 3, a portion of the command decoder 26 is illustrated. As previously described, in certain modes of operation, each of the individual memory cells of the memory array 22 may be sequentially accessed. For instance, certain modes of operation, such as the Fast Zero mode and the ECS mode, may facilitate sequential access to individual cells of the memory array 22 and coordinate the generation of internal memory addresses by the counter 30. To facilitate this functionality, the command decoder 26 includes a command controller 28 that includes one or more individual controllers 60 and 62 to control the address sequencing when a particular mode entry command (e.g., Fast Zero Entry command or ECS Command) is received. In the illustrated embodiment, the command controller 28 includes a state control fast zero mode controller 62 configured to receive a Fast Zero Entry command. The Fast Zero Entry command may be asserted by one of the processors 16 in the external controller 12 as part of the device power-up and initialization sequence, for instance. The fast zero mode controller 62 is configured to write logical 0s to each of the memory cells of the memory array 22. As will be appreciated, while the fast zero mode of operation is utilized to write logical 0s to each of the memory locations, a similar mode register command could also be used to write other known values to each of the memory locations (e.g., all logical 1s, or a specified and known pattern). When the Fast Zero Entry command is received by the fast zero mode controller 62, the fast zero mode controller 62 will cycle through the entire memory array 22, sequentially writing a zero to each memory cell. To sequentially write to each memory cell, one or more counters 30 may be employed to generate internal memory addresses by sequentially incrementing the counters 30. In accordance with one embodiment, the counters 30 may include a bank group counter 64, a bank address counter 66, a row address counter 68 and a column address counter 70. The usage of the counters 30 and execution of the Fast Zero Mode will be described in greater detail below with regard to FIG. 4.

In accordance with the present embodiments, a state control ECS controller 60 may also be provided to facilitate receipt and control of an ECS command. The ECS command may be utilized to systematically search for errors throughout the memory array 22 and correct the errors, if possible. As with the fast zero mode controller 62, the ECS controller 60 facilitates the generation of internal memory addresses using the counters 30, in order to sequentially access each individual memory cell of the memory array. As will be described in greater detail below with regard to FIG. 5, the ECS controller 60 may direct the testing of each memory cell for an error, correction of the error if possible, and logging of the error for later reporting.

Advantageously, each of the Fast Zero mode and the ECS mode utilize the same set of counters 30 to generate the internal memory addresses that facilitate sequential access to each memory cell, for the particular mode of operation. By utilizing the same shared counters 30 for multiple modes of operation that provide for the generation of internal memory addresses to sequentially access each cell of the memory array 22, hardware components and valuable real estate on the memory device may be conserved.

In the present embodiment, four counters are provided in order to facilitate the various groupings of cells for sequential access. Specifically, a bank group counter 64 is provided to switch from one bank group to another during sequential accessing of the memory array 22. In one embodiment, the memory array 22 may include four bank groups and the bank group counter 64 is a 2-bit counter. A bank address counter 66 is also provided to switch from one bank to another during sequential accessing of the memory array 22. In one embodiment, the memory array 22 may include two or four banks per one bank group and the bank address counter 66 is a 1-bit or 2-bit counter. A row address counter 68 is also provided to switch from one row to another during sequential accessing of the memory array 22. In one embodiment, the memory array 22 may include 32,768 rows and the row address counter 68 is a 16-bit counter. Finally, in the illustrated embodiment, a column address counter 70 is also provided to switch from one column to another during sequential accessing of the memory array 22. In one embodiment, the memory array 22 may include 128 columns and the column address counter 70 is a 7-bit counter.

While the presently described embodiments include counters 30 that are shared when the memory device 14 is in a Fast Zero Mode of operation or an ECS mode of operation, the counters 30 may be shared for other modes of operation, as well. For instance, if other test or setup modes employ sequential accessing of the entire memory array 22, or large portions of the memory array (e.g., an entire memory bank or bank group), the counters 30 can also be shared for these additional modes of operation, as well. Further, in certain embodiments of the memory device 14, it may be that not all of the illustrated counters in the counter block 30 are utilized. For instance, certain memory devices 14 may only employ one bank group. In such a device, the bank group counter 64 may not be utilized or may be omitted entirely from the memory device 14. Further, in certain embodiment of memory devices, additional counters 30 may be employed if other groupings of memory cells are provided.

Figure 4:
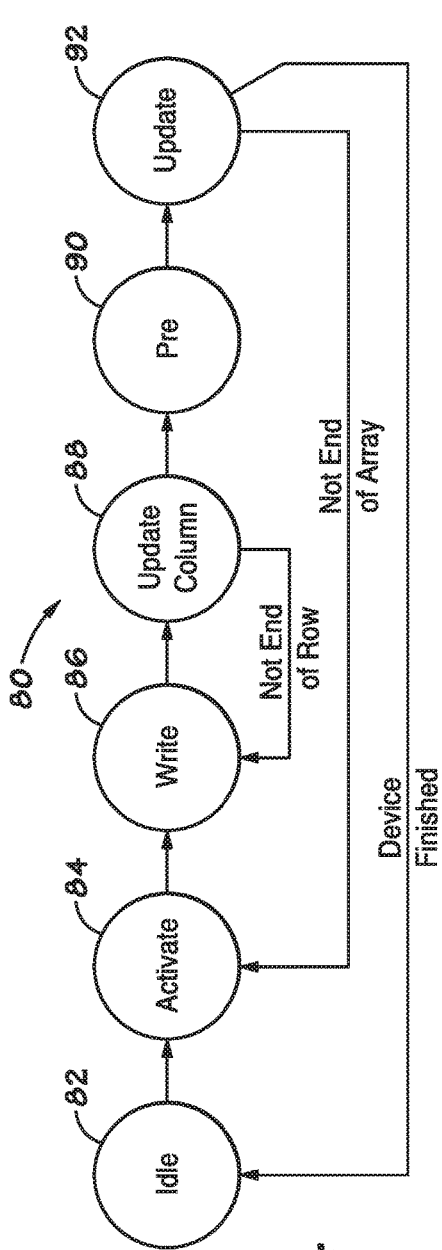
FIG. 4 is a state diagram illustrating a Fast Zero mode of operation of the memory device of FIG. 3, in accordance with an embodiment of the present disclosure.

Turning now to FIG. 4, a state diagram 80 illustrating an example of an implementation of a Fast Zero Mode sequence is provided. As previously described, the Fast Zero Mode may be entered during an initialization or power-up of the memory device 14. Before the Fast Zero Entry command is received by the fast zero mode controller 62, the memory device 14 may be in an Idle State 82. Next, the fast zero mode controller 62 receives the Fast Zero Entry command. Upon receipt of the Fast Zero Entry command, the fast zero mode controller 62 issues an activate command to the memory array 22, as indicated by the Active State 84. In accordance with one embodiment, the activate command may select or turn on one or more rows of each of the banks of the memory array 22 responsive to the row address counter 68. Because the Fast Zero Mode is intended to sequentially write a logical 0 to each cell of each of the banks of the memory array 22, multiple rows per each bank may be activated at once. In one embodiment, four rows per each bank may be activated at a time.

Once the selected row(s) is activated, a write command may be issued by the fast zero mode controller 62 to write a logical 0 to the first memory cell(s) in the selected row(s) of each bank responsive to the column address counter 70, as indicated by the Write State 86. After the first memory cell(s) in the selected row(s) is written, the fast zero mode controller 62 increments the column address counter 70 to generate the next sequential memory address (next column address) in the activate row(s), as indicated by the Update Column State 88. The Write State 86 and Update Column State 88 are then repeated for each column of the activated row(s) until the end of the activated row(s) is reached. Once the end of the row(s) of each bank is reached, a pre-charge (PRE) command may be sent to the active row(s) by the fast zero mode controller 62, in order to deactivate or precharge the row(s), as indicated by the Pre State 90.

Once the selected row(s) is deactivated or precharged, the row address counter 68 may be incremented such that a new internal row address is generated to access the next row or set of rows (e.g., set of four rows) of each bank, as indicated by the Update State 92, because writing logic 0 into a memory cell has not reached yet the end memory cell of each bank. Next, the process returns to the Activate State 84 to activate the next row(s) to be written. As may be appreciated, because every memory cell of each bank is to be written to (e.g., a logical 0) during the Fast Zero Mode of operation and the internal counters 30 are being controlled to generate the internal addresses to step through the memory cells in an ordered manner, a new activate command need not be generated during the Fast Zero Mode of operation. That is, once the initial activate command is sent, the fast zero mode controller 62 may repeat the steps indicated in the Activate State 84, Write State 86, Update Column State 88, Pre State 90 and Update State 92 without having to generate another activate command. Thus, the Activate State 84 may not necessarily refer to the assertion of an activate command once the initial activate command is sent.

In the embodiment illustrated by the state diagram 80, the process is repeated until a logical 0 is written into each cell of all rows of each of the banks of the memory array 22. Thus, the illustrated state diagram 80 indicates a process whereby only the row address counter 68 and column address counter 70 are utilized. That is, each bank may be activated and written to in parallel and thus, neither bank group counter nor the bank address counter 66 need be incremented. In alternative embodiments, each bank may be written to sequentially, such that the process includes incrementing of the bank group counter 64 and the bank address counter 66, once each column of each row of the bank is written to. Further, in the illustrated embodiment, the memory array may only include a single bank group and therefor, the bank group counter 64 may not be employed. However, those skilled in the art will appreciate that for memory arrays having multiple bank groups, the bank group counter 64 may be similarly employed for generation of the internal memory addresses to sequentially access the memory cells in additional banks, as will be described below with regard to the ECS Mode of operation.

Figure 5:
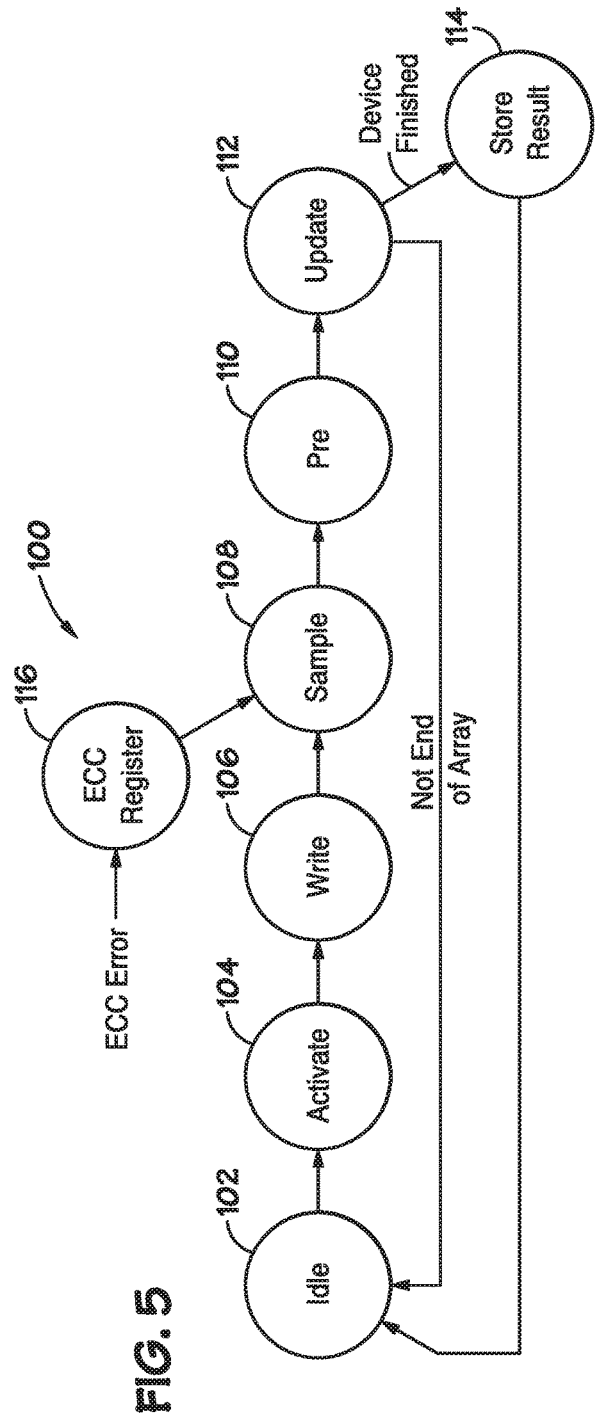
FIG. 5 is a state diagram illustrating an Error, Check and Scrub (ECS) mode of operation of the memory device of FIG. 3, in accordance with an embodiment of the present disclosure.

Turning now to FIG. 5, a state diagram 100 illustrating an example of an implementation of a ECS Mode sequence is provided. The ECS Mode may be entered periodically. In one embodiment, the ECS Mode may be entered after a Fast Zero Mode of operation has been asserted to write logical 0s to each memory cell. Further, the ECS Mode may be implemented periodically, depending on how often an error, check and scrub scrub of the memory array 22 is useful for a particular application. For instance, in various embodiments, the ECS Mode may be implemented once each day, once each week, once each month or once each year, for example.

Before the ECS command is received by the ECS controller 60, the memory device 14 may be in an Idle State 102. Next, the ECS controller 60 receives the ECS command. Upon receipt of the ECS command, the ECS controller 60 issues an activate command to the memory array 22, as indicated by the Active State 104. In accordance with one embodiment, the activate command may select or turn on one row in a first bank in a first bank group of the memory array 22 responsive to the bank group counter 64, the bank address counter 66 and the row address counter 68. Once the selected row is activated, a read-modify-write (RMW) command may be issued by the ECS controller 60 responsive to the column address counter 70, as indicated by the Write State 106. As appreciated, the RMW command provides a process of error detection and correction. When data is read from a memory cell of the memory array 22 designated by counters 64-70, an error correction code (ECC) is computed and compared with the read data value. If a match is detected, the data in the memory cell is correct. If there is no match, that data value is corrected (if possible) and the memory cell is re-written with the correct data value (if possible). As will be appreciated, certain hard errors may not be correctable (e.g., if the memory cell is damaged). Those skilled in the art will appreciate the usage of the RMW command and the error detection and correction capabilities provided by implementing such.

After the RMW action is performed on the first memory cell in the selected row, the ECS controller 60 updates an ECC register to increment an error counter, if an ECC error is detected, as indicated by the ECC Register State 116. The ECC register captures and holds the information from the ECC error. A Sample State 108 is provided to ensure that there is sufficient wait time to capture the ECC error in the ECC register before the next memory cell in the memory array 22 is tested. In one embodiment, the wait time may be approximately 10 ns, for instance. Once the wait time has expired, a pre-charge (PRE) command may be sent to the active row by the ECS controller 60, in order to deactivate the row and precharge the bank including a memory cell to be tested for a next RMW action, as indicated by the Pre State 110.

Once the selected row is deactivated, the relevant counter(s) 30 is updated, as indicated by the Update State 112. Specifically, the column address counter 70 is incremented with each cycle of an ECS command. The memory device 14 is then transitioned back to the Idle State 102 to await the next ECS command from the controller 12 to test the next memory cell. While in the Idle State 102, the controller 12 is free to continue other processing. This is repeated until the end of the row is reached, at which time the row address counter 68 is incremented and the column address counter 70 is reset. This is repeated until the last column of the last row of the memory bank is reached, at which time, the bank address counter 66 is incremented and each of the column address counter 70 and the row address counter 68 is reset. This is repeated until the last column of the last row of the last memory bank in a group is reached, at which time, the bank group counter 64 is incremented and each of the column address counter 70, the row address counter 68 and the bank address counter 66 is reset. Finally, once the entire memory device 14 has been tested the results of the ECS testing can be stored in a user-readable mode register, as indicated by the Store Result State 114. As will be appreciated, the mode register may be configured by a user to send an alert once an unacceptable number of errors has been detected and stored after ECS mode testing. For instance, an error threshold of 1K errors, 15K errors, 50K errors, 100K errors, etc. may be selected based on the particular application and the number of acceptable errors related thereto.

As described above, certain modes of operation, such as the Fast Zero mode and the ECS mode, may facilitate sequential access to individual cells of the memory array 22. To facilitate this functionality, a command controller 28 may be provided, including one or more individual controllers to control the address sequencing when a particular mode entry command (e.g., Fast Zero or ECS) is received. In order to generate internal addresses to be accessed sequentially, one or more counters 30 may also be provided. Advantageously, the counters 30 may be shared such that they can be used in any mode of operation that may require address sequencing of all or large portions of the memory array 22, such as the Fast Zero mode or the ECS mode.

While the current techniques may be susceptible to various modifications and alternative forms, specific embodiments have been shown by way of example in the drawings and have been described in detail herein. However, it should be understood that the current techniques are not intended to be limited to the particular forms disclosed. Rather, instead the present embodiments are intended to cover all modifications, equivalents, and alternatives falling within the spirit and scope of the present techniques as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A memory device comprising:
a memory array comprising a plurality of memory cells;
one or more command controllers configured to control access to the memory array when the one or more command controllers receives one of a plurality of mode commands, wherein the plurality of mode commands comprises a Fast Zero Entry command; and
one or more counters configured to generate internal memory addresses to sequentially access the plurality of memory cells when any one of the plurality of mode commands is received by the one or more command controllers.

2. The memory device of claim 1, wherein the plurality of mode commands comprises an Error, Check and Scrub (ECS) command.

3. The memory device of claim 1, wherein the one or more counters comprise a column address counter and a row address counter.

4. The memory device of claim 3, wherein the one or more counters comprise a bank address counter.

5. The memory device of claim 4, wherein the one or more counters comprise a bank group counter.

6. The memory device of claim 1, wherein the one or more command controllers comprise:
a fast zero controller configured to receive a Fast Zero Entry command to write logical 0s to each of the plurality of memory cells in the memory array; and
an ECS controller configured to receive an ECS command to perform an error check on each of the plurality of memory cells in the memory array.

7. The memory device of claim 1, wherein the memory device comprises a double data rate type five synchronous dynamic random access memory (DDR5 SDRAM).

8. An apparatus comprising a memory device, wherein the memory device comprises:

a memory array comprising a plurality of memory cells;
a command controller configured to receive a plurality of commands; and
a set of counters configured to generate internal row and column addresses to access the plurality of memory cells responsive, at least in part, to the command controller receiving a first command of the plurality of commands, the at least one of the plurality of counters further configured to generate internal row and column addresses to access the plurality of memory cells responsive, at least in part, to the command controller receiving a second command of the plurality of commands, wherein the first command of the plurality of commands is a Fast Zero Entry command and the second command of the plurality of commands is an Error, Check and Scrub (ECS) command.

9. The apparatus of claim 8, wherein the memory array comprises a plurality of memory banks, wherein each of the plurality of memory banks includes a portion of the plurality of memory cells.

10. The apparatus of claim 9, wherein the set of counters is further configured to generate internal bank addresses.

11. The apparatus of claim 10, wherein the plurality of memory banks is arranged in groups of memory banks and wherein the set of counters is further configured to generate internal bank group addresses.

12. The apparatus of claim 8, wherein the set of counters comprises a row address counter and a column address counter, wherein each of the row address counter and the column address counter is used to generate the internal row and column addresses responsive, at least in part, to each of the Fast Zero Entry command and the Error, Check and Scrub (ECS) command.

13. A method, comprising:
implementing at least one of a plurality of counters to facilitate sequential access of a plurality of memory cells on a memory device, in response to the assertion of a first command for entering a first mode of operation, wherein the first mode of operation comprises a Fast Zero Mode; and
implementing the at least one of the plurality of counters to facilitate sequential access of the plurality of memory cells, in response to the assertion of a second command for entering a second mode of operation, different from the first mode.

14. The method of claim 13, wherein implementing the at least one of the plurality of counters comprises implementing a row address counter and a column address counter.

15. The method of claim 14, wherein implementing that at least one of the plurality of counters comprises implementing a bank address counter and a bank group counter.

16. The method of claim 13, wherein the second mode of operation comprises an Error, Check and Scrub (ECS) Mode.

17. The method of claim 13, wherein each of the plurality of counters is controlled by a command controller on the memory device.

* * * * *